United States Patent [19]
Chheda et al.

[11] Patent Number: 6,075,815
[45] Date of Patent: Jun. 13, 2000

[54] SYMBOL-ENERGY-TO-NOISE-DENSITY ESTIMATION IN A QPSK MODULATED COMMUNICATION SYSTEM

[75] Inventors: Ashvin Chheda, Dallas; Michael S. Feeney, Allen; Ahmad Jalali, Plano, all of Tex.

[73] Assignee: Nortel Networks Corporation, Richardson, Tex.

[21] Appl. No.: 08/931,991

[22] Filed: Sep. 17, 1997

Related U.S. Application Data

[60] Provisional application No. 60/041,208, Mar. 26, 1997.

[51] Int. Cl.[7] .................................................. H04B 17/00
[52] U.S. Cl. ...................................... 375/227; 455/226.3
[58] Field of Search ............................. 375/227, 261, 375/324, 329; 455/135, 226.2, 226.3

[56] References Cited

U.S. PATENT DOCUMENTS

| | | | |
|---|---|---|---|
| 4,985,900 | 1/1991 | Rhind et al. | 375/227 |
| 5,383,219 | 1/1995 | Wheatley, III et al. | 375/34 |
| 5,461,639 | 10/1995 | Wheatley, III et al. | 375/205 |
| 5,603,096 | 2/1997 | Gilhousen et al. | 455/69 |
| 5,604,780 | 2/1997 | Tiedemann | 870/252 |
| 5,719,898 | 2/1998 | Davidovici et al. | 375/200 |

*Primary Examiner*—Temesghen Ghebretinsae
*Assistant Examiner*—Kevin M Burd
*Attorney, Agent, or Firm*—John D. Crane; Kenneth Bolvin

[57] ABSTRACT

The process determines the I channel and Q channel components for each received soft value. The location of each soft value with respect to the fade line is determined using the I and Q channel components. These locations are averaged over a power control group duration to determine the noise density. The symbol energy is determined by subtracting the average perpendicular distance from the soft value point to the fade line from half the square of the average of the distance from the soft value point to the origin.

4 Claims, 4 Drawing Sheets

SYMBOL-ENERGY-TO-NOISE-DENSITY ESTIMATION IN A QPSK MODULATED COMMUNICATION SYSTEM

RELATED APPLICATION

This application claims priority based on Provisional Patent Application Ser. No. 60/041,208 filed on Mar. 26, 1997.

BACKGROUND OF THE INVENTION

I. Field of the Invention

The present invention relates to radio communications. More particularly, the present invention relates to symbol-energy-to-noise-density measurement in a code division multiple access radiotelephone system.

II. Description of the Related Art

Multiple access modulation techniques are some of the most efficient techniques for utilizing the limited radio frequency spectrum. Examples of such techniques include time division multiple access (TDMA), frequency division multiple access (FDMA), and code division multiple access (CDMA).

CDMA modulation employs a spread spectrum technique for the transmission of information. A spread spectrum system uses a modulation technique that spreads the transmitted signal over a wide frequency band. This frequency band is typically substantially wider than the minimum bandwidth required to transmit the signal.

A form of frequency diversity is obtained by spreading the transmitted signal over a wide frequency range. Since only part of a signal is typically affected by a frequency selective fade, the remaining spectrum of the transmitted signal is unaffected. A receiver that receives the spread spectrum signal, therefore, is affected less by the fade condition than a receiver using other types of signals.

The spread spectrum technique is accomplished by modulating each base band data signal to be transmitted with a unique wide band spreading code. Using this technique, a signal having a bandwidth of only a few kilohertz can be spread over a bandwidth of more than a megahertz. Typical examples of spread spectrum techniques are found in M. K. Simon, *Spread Spectrum Communications,* Volume I, pp. 262–358.

In a CDMA-type radiotelephone system, multiple signals are transmitted simultaneously at the same frequency. A particular receiver then determines which signal is intended for that receiver by a unique spreading code in each signal. The signals at that frequency, without the particular spreading code intended for that particular receiver, appear to be noise to that receiver and are ignored.

Since multiple radiotelephones and base stations transmit on the same frequency, power control is an important component of the CDMA modulation technique. A higher power output by a radiotelephone and/or base station increases the interference experienced by the other radiotelephones and base stations in the system. In order to keep the radiotelephones and base stations from transmitting at too much power, thereby lowering system capacity, some form of power control must be implemented.

The radiotelephone can aid the base station in the control of the power on the forward link (from the base station to the radiotelephone) by transmitting a power control message to the base station on the reverse link (from the radiotelephone to the base station). The radiotelephone gathers statistics of its error performance and informs the base station via a power control message. The base station may then adjust its power level to the specific user accordingly.

In a typical CDMA cellular communication system that follows the Telecommunications Industries Association/Electronic Industries Association Interim Standard 95 (IS-95), the base station adjusts its forward link power at a rate no faster than once per frame. This results in a high $E_b/N_o$ on the forward link during low speed travel of the radiotelephone, due to the effects of Rayleigh fading, since the radiotelephone remains in the fade longer.

The ratio $E_b/N_o$ is a standard quality measurement for digital communications system performance. The ratio expresses the bit-energy-to-noise-density of the received signal. $E_b/N_o$ can be considered a metric that characterizes the performance of one communication system over another; the smaller the required $E_b/N_o$ the more efficient is the system modulation and detection process for a given probability of error. A more detailed discussion of this concept can be seen in B. Sklar, *Digital Communications, Fundamentals and Applications,* Chapter 3 (1988).

A related metric is the $E_s/N_o$, which is the ratio of symbol-energy-to-noise-density of the received signal. The $E_s/N_o$ is related to the $E_b/N_o$ by:

$$E_s/N_o = (E_b/N_o) N$$

where N is the number of bits per symbol. In binary phase shift keying (BPSK) modulated communication systems, N=1 and, consequently, $E_s/N_o = E_b/N_o$. In quadrature phase shift keying (QPSK) modulated communication systems, N=2 so that $E_s/N_o = 2(E_b/N_o)$. Because symbols are actually transmitted, it is often more convenient to measure $E_s/N_o$ directly and then convert to $E_b/N_o$ if desired.

When a high $E_s/N_o$ or related metric, like $E_b/N_o$, is experienced, the system attempts to increase the transmit power in order to overcome the fade. However, when the radiotelephone moves out of the fading conditions, the transmit power must be decreased quickly or system capacity will suffer.

The IS-95 power control process may not be able to lower the transmit power fast enough. Fast forward link power control decreases the transmit power rapidly but relies on finding an accurate estimate of $E_s/N_o$ or related metric. Additionally, there must be a way to switch between using the IS-95 power control and fast forward power control since they behave differently under different conditions. There is an unforeseen need for a process to find a reliable estimate of the bit-energy-to-noise-density or symbol-energy-to-noise-density of the channel and also be able to determine when to use the IS-95 power control and fast forward power control.

SUMMARY OF THE INVENTION

The present invention encompasses a process for determining the symbol-energy-to-noise-density ratio of a received signal in a radio communication channel. The radio has a correlator that outputs a series of soft value pairs. The soft value pairs are in an I and Q axes system in which a fade line extends through the origin at a 45° angle to the I axis and a second fade line extends through the origin at a 135° angle to the I axis.

The process first breaks up the received soft value pairs into their I channel and Q channel components. The location of the soft value pairs with respect to the closest fade line is then determined using the I and Q components. This is accomplished by determining the distance from the soft value pair to the origin and the angle between the closest fade line and the line extending from the soft value pair to the origin. This distance times the sine of the angle gives the perpendicular distance to the fade line from the soft value pair.

The locations of the plurality of soft value pairs are averaged over a power control group duration to determine the noise density. The symbol energy is determined by subtracting twice the square of the average perpendicular distance from the square of the average of the distance to from the soft value point to the origin.

DETAILED DESCRIPTION OF THE PREFERRED EMBODIMENT

The processes of the present invention enable a radiotelephone in a radiotelephone communication system to assist in rapidly adjusting a base station's transmit power by quickly estimating an accurate $E_s/N_o$ or other metric. Additionally, the present invention is able to determine when the standard IS-95 power control process should be used for better performance and when the fast forward power control process of the present invention is needed for better performance.

The following discussion refers to mobile radiotelephones and base stations as the preferred embodiment. Mobile radiotelephones include radios used in a terrestrially based communication system as well as a satellite based communication system. Similarly, the base stations can be located on the earth or as orbiting satellites.

Additionally, the present invention estimates and uses the received $E_s/N_o$ and compares this to a target $E_s/N_o$. These quantities, of course, could be divided by two for transformation to $E_b/N_o$ quantities. Additional embodiments use other signal quality metrics.

The current IS-95 CDMA system results in a high $E_s/N_o$ on the forward traffic channel (from the base station to the mobile radiotelephone) during low speed operation due to a slower power control process. This is due to the effects of Rayleigh fading being more pronounced at low speeds than high speeds since the radiotelephone is in the fade longer at the lower speeds. Additionally, at higher speeds, the interleaving spreads out the effects of the fading, thus lowering the required $E_s/N_o$.

The IS-95 implementation of the forward link power control enables each base station to adjust its forward traffic channel power at a rate of once per frame during Rate Set 2 operation. The transmit power change is slower during Rate Set 1 operation.

Rate Set 1 and 2 forward link power control operation are defined in the IS-95A standard. Rate Set 1 uses transmitted rates of 9600 bits per second (bps), 4800 bps, 2400 bps, and 1200 bps. Rate Set 2 uses transmitted rates of 14,400 bps, 7200 bps, 3600 bps, and 1800 bps.

Rate Set 1 forward link power control operation is slower due to its two modes of operation. In one mode, the radiotelephone must first count a configured number of received frame erasures and then send a power control message to the base station. This is referred to in the art as threshold reporting. In the second mode, the radiotelephone waits for a configured number of frames before sending a power control message to the base station. This is referred to in the art as periodic reporting.

Fast forward link power control requires that the forward link transmit powers should be adjusted as rapidly as possible. In the preferred embodiment, this adjustment is done every sixteenth of a frame. This sixteenth of a frame is referred to in the art as a power control group.

Figure 1:
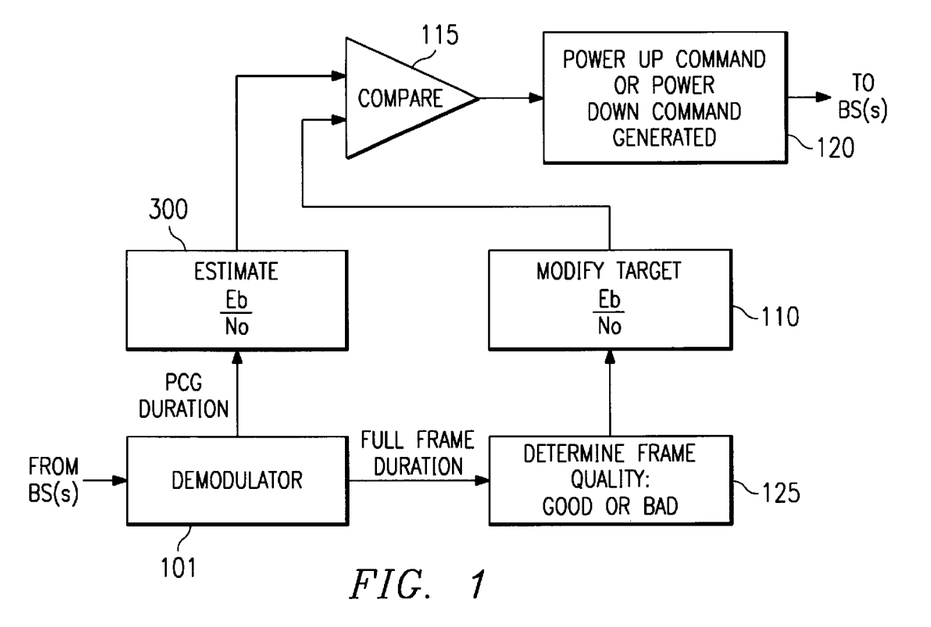
FIG. 1 shows a block diagram of a fast forward link power control process.

A block diagram of the fast forward link power control process of the present invention is illustrated in FIG. 1. This process is used by the radiotelephone in determining whether to transmit a power up or power down command to the base station.

The radiotelephone receives information from the base station. This information is in the form of a stream of data frames. The type and format of this data is well known in the art.

The radiotelephone demodulates (step 101) the information. The $E_s/N_o$ is estimated (step 300), for a power control group duration, using the estimation process of the present invention illustrated in FIG. 3. This process is discussed subsequently.

The estimated $E_s/N_o$ is compared (step 110) to a target $E_s/N_o$. The target $E_s/N_o$ is adjusted on a frame by frame basis. The target is modified (step 110) in such a way as to maintain the required frame error rate. In the preferred embodiment, this frame error rate target is set by the network operators.

In order to modify the target $E_s/N_o$, the quality of each received frame is determined (step 125). If a particular received frame was good, the target is decreased a predetermined amount. If the particular received frame was bad, the target is increased a predetermined amount. The predetermined amount being set by the network operators. Determining the quality of the frames is well known in the art and is discussed in John G. Proakis, *Digital Communications*, Chapter 7.

If the estimated $E_s/N_o$ is less than the target $E_s/N_o$, the radiotelephone instructs (step 120) the base station to power up by a predetermined amount. If the measured $E_s/N_o$ is greater than the target $E_s/N_o$, the radiotelephone instructs (step 120) the base station to power down by a predetermined amount. In the preferred embodiment, the predetermined amount is 1 dB. Alternate embodiments use other values set by the network operators, such as 0.5 dB.

The power change commands, in the preferred embodiment, are transmitted using a reverse power control signaling channel. The reverse power control signaling channel can also be used for special messages such as periodically transmitting information on the active and candidate set pilots with which the radiotelephone is dealing. This gives the network continuous information on hand-off status.

The preferred embodiment employs a reverse link pilot channel that the base station uses to perform coherent demodulation of the reverse power control signaling channel. The reverse link pilot channel is transmitted by the radiotelephone and can be used to coherently demodulate the traffic channel.

The reverse link pilot channel is a unique channel for each radiotelephone. In the preferred embodiment, the channel uses the radiotelephone's long code as part of the spreading/modulation.

Alternate embodiments use other forms for transmitting the power control commands. One embodiment punctures the data stream to the base station. A single power control bit is punctured into the data stream at predetermined locations in order for the base station to know the location. A logical one instructs the base station to increase power while a logical zero instructs the base station to decrease power by the predetermined amount.

Alternate embodiments use other power control instructions. One embodiment uses logical zero for power increase and logical one for power decrease. Other embodiments use more than one bit for power control. For example, if two bits are used, a total of four different step sizes are possible (e.g., up by 1 dB, up by 0.5 dB, down by 1 dB, down by 0.5 dB, etc.).

By puncturing the data stream in known locations, the base station knows where to look for the power control command. In one embodiment, the data stream is punctured with the power control bit every n+3 bits, where n is an integer in the range of 0 to ∞.

Alternate embodiments puncture the data stream in other locations. As long as the data stream is not punctured contiguously, the loss of data is so minimal that the puncturing does not affect the communication quality.

For proper operation of the above power control process of the present invention, the $E_s/N_o$ received by the radiotelephone must be determined. In order to understand the process of estimating the $E_s/N_o$, background theory of CDMA is first discussed.

As is well known in the art, information transmitted from the base station to the radiotelephone is modulated using quadriphase shift keying (QPSK). A transmitted signal experiences Rayleigh fading plus an additive white gaussian noise component to both the I and Q components of the signal. The transmitted signals thus have the mathematical form:

$$I \text{ channel: } A_S(t) \cdot re\{e^{j\omega_c t}\}$$

$$Q \text{ channel: } A_S(t) \cdot re\{e^{j(\omega_c t + \frac{\pi}{2})}\};$$

where $A_S(t)$ is the transmitted amplitude and $\omega_c$ is the CDMA carrier frequency.

On reception, the signals have the form:

$$I \text{ channel: } A_R(t) \cdot re\{\alpha e^{j\phi} e^{j\omega_c t}\} + n_i(t)$$

$$Q \text{ channel: } A_R(t) \cdot re\{\alpha e^{j\phi} e^{j(\omega_c t + \frac{\pi}{2})}\} + n_q(t);$$

where $A_R(t)$ is the received amplitude due to the path loss (lost signal energy due to distance, shadowing, etc.), $\alpha e^{j\phi}$ represents the amplitude attenuation and phase shift due to the channel fading, and $n_i(t)$ and $n_q(t)$ are the additive white gaussian noise terms. The white gaussian noise terms represent both thermal noise and CDMA interference.

For each multi-path component, the I and Q components of the signal fade identically. Based on the received energy, the fading coefficients are estimated for each multi-path via the pilot channel. This is used in maximal ratio combining that is well known in the art.

Maximal ratio combining, performed by the Rake receiver, is a technique by which different fading paths (multi-paths) are combined in the receiver. Each path is weighted by an estimate of its received amplitude before being combined with the other paths.

The fading coefficients, $\alpha$ and $\phi$, are estimated by dividing the output of the pilot channel correlator by the energy of the pilot channel. This is illustrated in the following equations. The pilot channel correlator output is expressed as:

$$Y_{pilot} = 2\alpha_L \epsilon_{pilot} e^{j\phi_L} + N_P$$

where $\epsilon_{pilot}$ is the known symbol energy transmitted on the pilot channel and $N_P$ is the noise on the pilot channel and is represented by:

$$N_p = A \int_0^T Z_1(t) dt.$$

The estimates of $\alpha$ and $\phi$ are then found by:

$$\frac{Y_{pilot}}{2\epsilon_{pilot}} = \alpha_L e^{j\phi_L} + \frac{N_p}{2\epsilon_{pilot}}.$$

The receiver/demodulator outputs soft values for both the I and the Q channels. As is well known in the art, the soft values are normally used by the Viterbi decoder to determine what information was transmitted. In the present invention, however, the soft values are used by the $E_s/N_o$ estimation process.

Figure 3:
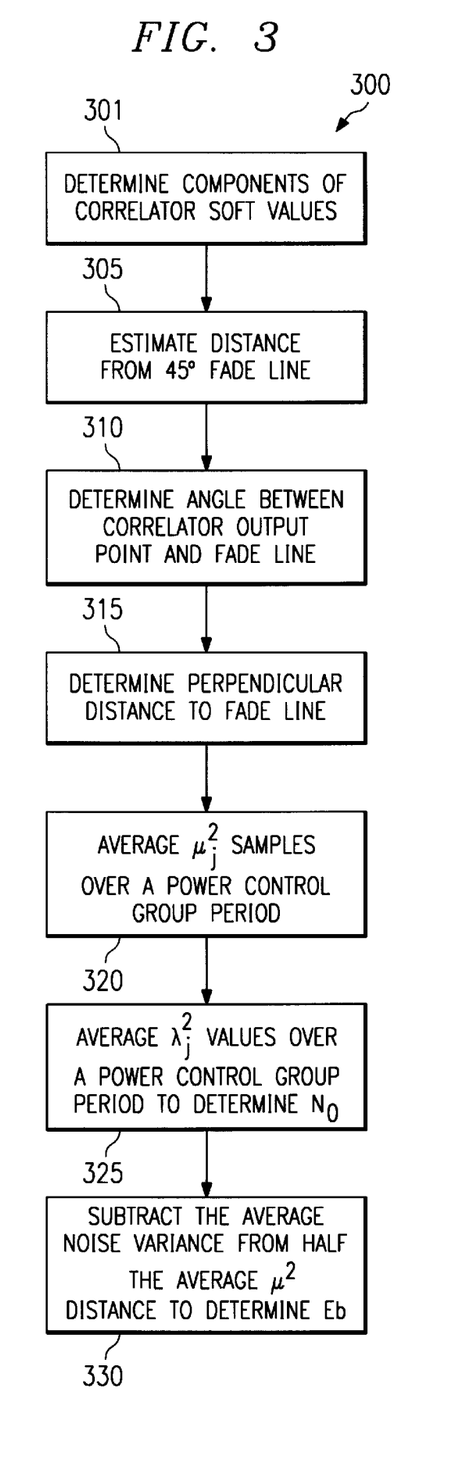
FIG. 3 shows a flowchart of a signal symbol-energy-to-noise-density estimation process.

The $E_s/N_o$ estimation process of the present invention, illustrated in FIG. 3, is used by the power control process discussed above in controlling transmit power over the forward link. The $E_s/N_o$ estimation process, however, is not limited to power control. The estimation process can be used anytime a noise estimate is required in a QPSK system.

Referring to the FIG. 3, the soft values are first broken up into their components (step 301), each QPSK symbol producing two soft values:

$$I \text{ channel: } \beta\sqrt{\frac{E_s}{2}} d_i + n_i = x$$

$$Q \text{ channel: } \beta\sqrt{\frac{E_s}{2}} d_q + n_q = y$$

where $d_i$ and $d_q$ are the polarities of the I-channel and Q-channel bits and are either +1 or −1, the coefficient $\beta$ is due to the fading, and the n terms are due to the additive white gaussian noise in the channel.

The soft values are continuously updated and output by the correlator. Therefore, a series of values is generated by the correlator. In the present invention, $(x_1, y_1)$ is the first output, $(x_2, y_2)$ is the second output, and $(x_j, y_j)$ is the $j^{th}$ output.

In order to estimate the $E_s/N_o$, the noise density, $N_o$, must be estimated. Since the I and Q channels fade together, the point $(x_j, y_j)$ falls somewhere on a 45° or 135° line depending on which QPSK data symbol was transmitted. However, due to noise, $(x_j, y_j)$ is displaced from this line. Finding the distance from $(x_j, y_j)$ to the line, therefore, gives an estimate of $N_o$.

Figure 2:
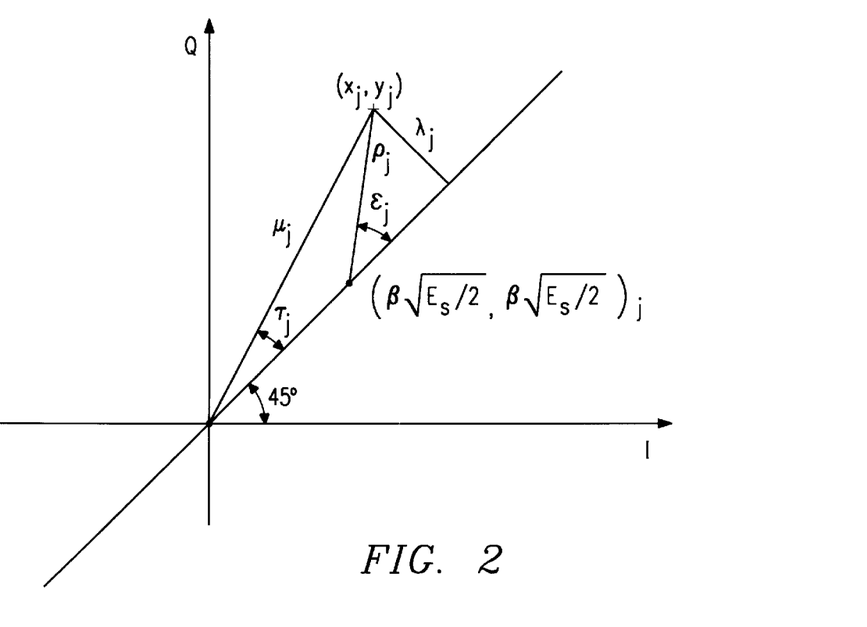
FIG. 2 shows an I and Q axes diagram having a correlator output point above the 45° fade line.

FIG. 2 illustrates an embodiment where the $j^{th}$ point lies in the upper right quadrant. Alternate embodiments, however, accommodate the point $(x_j, y_j)$ in any of the four quadrants. Illustrated in FIG. 2 is the 45° line and point $(x_j, y_j)$.

The distance is denoted $\mu_j$ in FIG. 2 and is computed (step 305) by:

$$\mu_j = \sqrt{x_j^2 + y_j^2} \text{ ; therefore } \mu_j^2 = x_j^2 + y_j^2.$$

The angle denoted $\tau_j$ in FIG. 2 is the angle between the point $(x_j, y_j)$ and the 45° line. This angle is computed (step 310) by:

$$\tau_j = |\tan^{-1}|(y_i/x_j)|-45°|.$$

The perpendicular distance to the 45° line is illustrated in FIG. 2 as $\gamma_j$. This distance is found (step 315) by the equation:

$$\gamma_j = \mu_j \sin(\tau_j).$$

It should be noted that this equation accommodates the soft values $x_i$ and $y_i$ lying in any of the four possible quadrants. The inner and outer absolute value operators in effect transform any combination of $x_i$ and $y_i$ to the upper right quadrant.

The samples of $\mu_j^2$ are averaged (step 320) over a number of correlator outputs (one power control group period). The averaging of $\mu^2$ during the power control group period takes the form:

$$\overline{\mu^2} = \frac{1}{n}\sum_{j=1}^{n}\mu_j^2$$

where n is the number of samples taken in the power control group.

The averaging process is accomplished by first substituting x and y from above into the equation for $\mu_j$ to yield:

$$\mu_j^2 = \left(\beta_j\sqrt{\frac{E_s}{2}}d_{ij} + n_{ij}\right)^2 + \left(\beta_j\sqrt{\frac{E_s}{2}}d_{qj} + n_{qj}\right)^2$$

$$\mu_j^2 = \beta_j^2\frac{E_s}{2} + \beta_j^2\frac{E_s}{2} + n_{ij}^2 + n_{qj}^2 + 2\beta_j\sqrt{\frac{E_s}{2}}n_{ij} + 2\beta_j^2\sqrt{\frac{E_s}{2}}n_{qj},$$

noting that $d_{ij}^2 = d_{qj}^2 = 1$.

The last two terms of the equation fall out when the average is computed since the noise and fading are statistically independent and the average of the noise alone has a zero mean. Averaging over a power control group period yields:

$$\overline{\mu_j^2} = \beta_j^2 E_s + n_{ij}^2 + n_{qj}^2$$

or $$\overline{\mu^2} = \beta^2 E_s + 2\sigma_n^2,$$

note that $\overline{\beta^2}E_s$ is the average received symbol energy and $2\sigma_n^2$ is the average noise power. The noise power is also denoted $\rho^2$.

The values of $\gamma_j^2$ are next averaged over a power control group period (step 325). Substituting the variance of the noise power into the equation for $\gamma$ above results in:

$$\lambda_j^2 = (\rho_j^2(\sin\varepsilon_j))^2 = \rho_j^2\left(\frac{1}{2} - \frac{\cos 2\varepsilon_j}{2}\right)$$

where $\rho$ and $\epsilon$ are independent and $\epsilon$ is zero-mean. Therefore, taking the average of $\gamma$ results in the noise power estimate:

$$\overline{\lambda^2} = \frac{\overline{\rho^2}}{2} = \sigma_n^2 = \frac{N_O}{2}.$$

The signal energy per symbol is estimated by subtracting the average noise variance from half the average $\mu^2$ distance (step 330). This value is expressed by:

$$E_s = \overline{\mu^2} - 2\gamma^2.$$

Finally, the ratio for $E_s/N_o$ can be formed as:

$$\frac{E_s}{N_O} = \frac{\mu^2 - 2\lambda^2}{2\lambda^2}.$$

Figure 4:
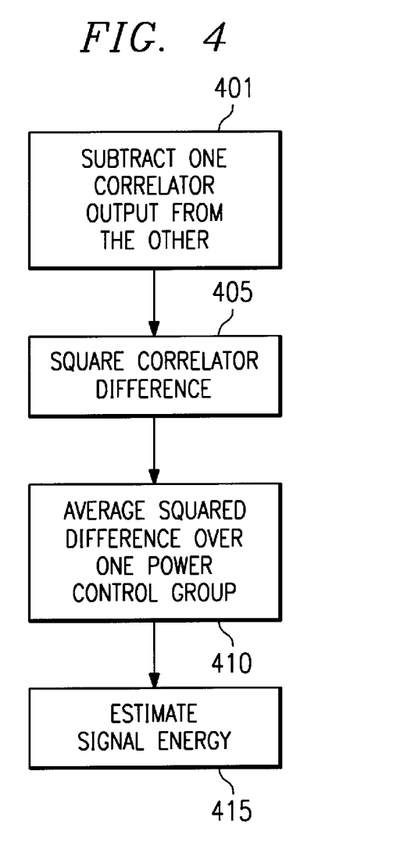
FIG. 4 shows a flowchart of an alternate embodiment of a signal symbol-energy-to-noise-density estimation process.

An alternate embodiment process for estimating the $E_s/N_o$, illustrated in FIG. 4, is accomplished using the pilot channel on the forward link. The pilot is not modulated (i.e., the same information is transmitted on the pilot I and Q channels), therefore, the signal components in the I-correlator and Q-correlator outputs are identical. This is due to the channel fading and the symbol polarity being the same with only the noise components differing. The I and Q channel correlator outputs are represented by:

I channel: $\beta\sqrt{\frac{E_s}{2}} + n_i$

Q channel: $\beta\sqrt{\frac{E_s}{2}} + n_q.$

Referring to FIG. 4, the alternate estimation process for $E_s/N_o$ begins by subtracting the Q channel correlator output from the I channel correlator output (step 401), or vice versa. The difference is then squared (step 405) and averaged over a power control group (step 410). This yields two times the noise variance. These steps are represented by:

$$(I-Q)^2 = n_i^2 + n_q^2 = \sigma_n^2 = N_o.$$

The signal energy is then estimated (step 415) by using the distance $\mu$, from FIG. 2, that was computed above. The signal energy estimation step is expressed as:

$$E_s = \overline{\mu^2} - 2\sigma_n^2.$$

As explained above, once the $E_s/N_o$ is obtained, it is compared to the radiotelephone's target $E_s/N_o$. The difference between the estimated $E_s/N_o$ and the target $E_s/N_o$ triggers the radiotelephone's power control commands.

One possible problem with most fast forward link power control processes is that performance during soft hand-off may suffer if not monitored. Referencing FIG. 5, the mobile radiotelephone (510) was originally communicating with base station 2 (501). The radiotelephone (510) then goes into hand-off with base station 1 (505). During this time, both base stations are transmitting at a high output power (for example, approximately 9% of their total power).

Figure 5:
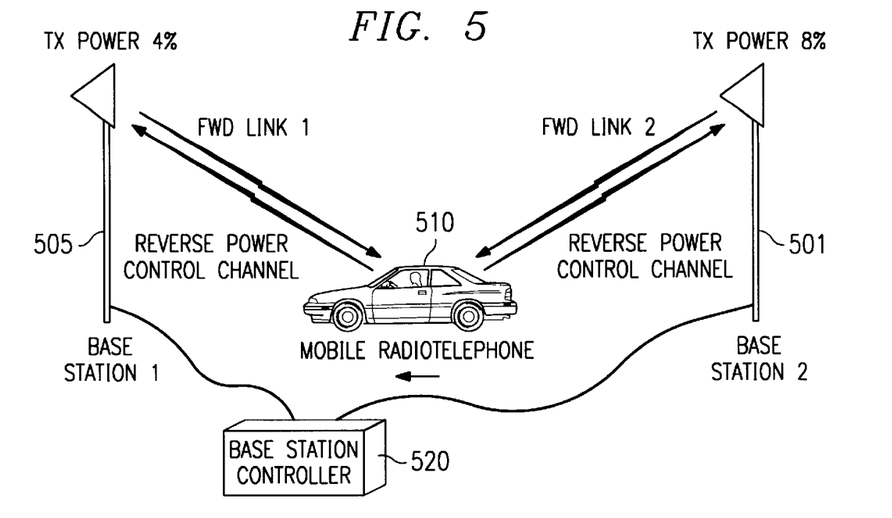
FIG. 5 shows a radiotelephone communication system in communication with a mobile radiotelephone.

As the radiotelephone (510) moves towards base station 1 (505), the link with base station 2 (501) degrades very quickly. During this time, the link with base station 1 (505) is adequate and the radiotelephone (510) sends mainly power down commands.

Due to the distance, shadowing, and/or fading, the reverse link to base station 2 (501) is inadequate and the power control information to base station 2 (501) has a high error rate. The transmit power at base station 2 (501), for example, may increase or remain at some high value such as 11% or 12%. During this time, the link between the radiotelephone (510) and base station 1 (505) continues to improve so that base station 1 (505) continues to power down to possibly 6% or 7%. This scenario is possible at a 50% power control bit error rate to base station 2.

The power down commands the mobile is sending are received correctly at base station 1 but, since the link to base station 2 is degraded, the bits have a high bit error rate to base station 2. This results in base station 2 not adjusting its power down as quickly as base station 1. The capacity suffers since base station 2 is needlessly using higher power from its available pool and also increasing system multiple access nose.

In this example, the capacity of the system is impacted since base station 2 (501) is transmitting at a higher power level than is required. Since 20% of total transmit power is allocated to pilot, synchronizing, and paging channels, 80% is allocated for traffic. If 12% of that 80% is needlessly used to maintain a poor link, the system capacity is reduced.

Figure 6:
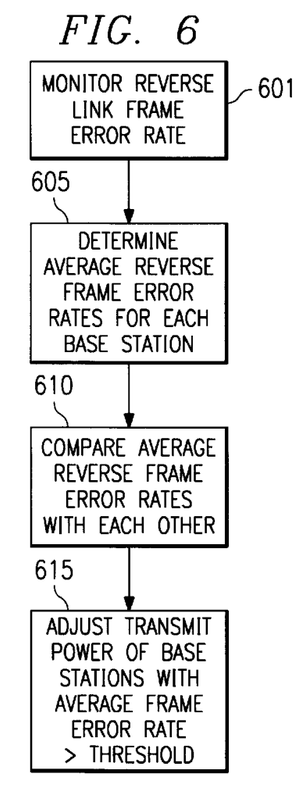
FIG. 6 shows a flowchart of a power synchronizing process.

The power control synchronizing process of the present invention, illustrated in the flowchart of FIG. 6, fixes this problem by synchronizing the power levels of the base stations during soft hand-off. This is accomplished by adjusting the gains of base stations having poor quality reverse links to the gain of the base station having the highest quality reverse link.

The process typically only works on base stations since the individual reverse links are monitored. For sectors of the same base station, this is not possible since the reverse links are not distinguishable. However, this is not an important point since sectors of the same base station use the same hardware and will ultimately transmit at the same power. In other words, sectors of the same base station involved in hand-off with the radiotelephone will receive the exact same power control bit on the reverse link since they see the same modulating/demodulating hardware at the base station. As a result, there is typically not a need for adjustment/correction between the sectors.

The process begins by the base station controller monitoring the reverse link frame error rate (step 601) over a period of a predetermined number of frames. In the preferred embodiment, the predetermined number of frames is 20. Alternate embodiments monitor over other periods.

The reverse link frame error rate provides an indication of the fast forward link power control bit error rate for that particular base station. It can be assumed that if the reverse link frame error rate is high, the fast forward link power control bit error rate is also going to be high.

The base station controller (520) monitors the reverse link of each base station involved in the soft hand-off. FIG. 5 shows the base station controller (520) controlling both base station 1 (505) and base station 2 (501). However, in alternate embodiments, the base station controller (520) monitors the reverse link of base stations coupled to other base station controllers.

For example, in an intersystem soft hand-off, each system has its own base station controller that monitors its own base stations. In this case, the two base station controllers need to pool all of the reverse link information together.

At the end of the predetermined frame period, the average reverse frame error rates are computed for each base station (step 605) and compared with each other (610). This determines the link with the best average reverse frame error rate. The length of the frame period is chosen by the operating software at the base station controller.

Each of the average reverse frame error rates are compared to a predetermined frame error rate percentage threshold (step 610). In the preferred embodiment, this threshold is set by the link with the best average reverse frame error rate. Alternate embodiments set the threshold as a data parameter.

If any of the average reverse frame error rates are greater than the predetermined percentage threshold, the transmit power of those links is adjusted by the base station controller (step 615). The transmit power is adjusted to the last known transmit power of the base station having the lowest average frame error rate over that predetermined frame period.

In the embodiment of FIG. 5, this process results in the base station controller (520) scaling the transmit power of base station 2 (501) down to the last known value of the transmit power of base station 1 (505). By synchronizing the transmit power of multiple base stations, the power of one base station is not reduced too far such that the communication link is lost. Reducing the transmit power of base station 2 (501) to zero could possibly cause the radiotelephone (510) to lose diversity with the base stations (501 and 505). Even though this link is of low quality, it may be needed later if the link's bit error rate improves for some reason, such as the radiotelephone (510) reversing course.

The power control synchronizing process of the present invention does not have to be implemented in a fast forward link power control environment. This process operates in any environment requiring transmit power synchronization between multiple base stations. Additionally, even though only two base stations were used in the embodiment of FIG. 5, the transmit power synchronization process works with more than two base stations.

Another process of the present invention that improves fast forward link power control is a data rate change process. This process, illustrated in FIG. 7, adjusts base station transmit power based on the traffic frame rate on the forward link.

As the frame rate drops on the forward link, such as from full rate to half rate or half rate to eighth rate, $E_s/N_o$ requirements for successful demodulation are also typically reduced. If the base station changed to a lower rate and the transmit power is not adjusted, the base station is transmitting at a higher power level than is required to maintain a target $E_s/N_o$.

Figure 7:
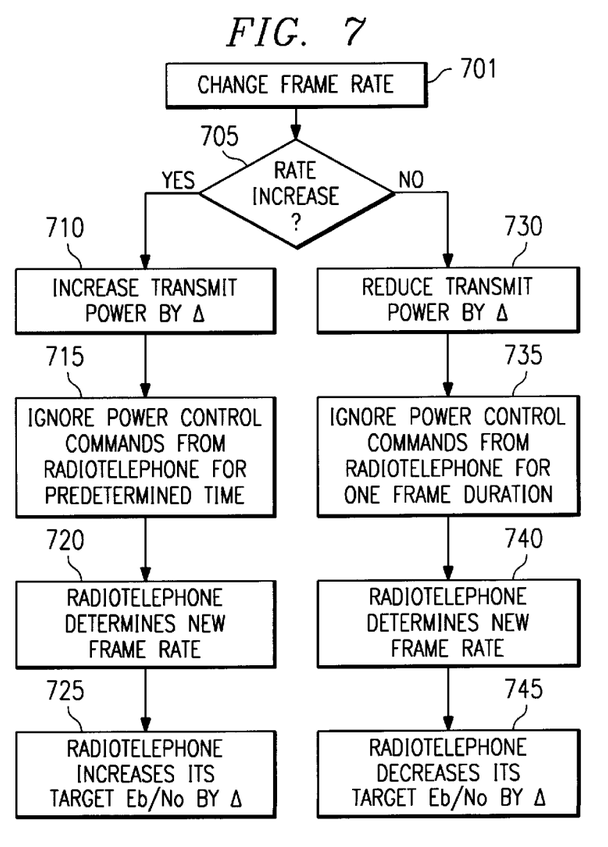
FIG. 7 shows a flowchart of a data rate change power control process.

Referring to the process of FIG. 7, the base stations first change the frame rate (step 701). If the change was a frame rate decrease (step 705), the lower rate requires less power so that the base station also reduces transmit power (step 730). In the preferred embodiment, the transmit power is decreased by a predetermined $\Delta_{rate\_x \; to \; rate\_y}$ dB where rate_x is the higher rate and rate_y is the lower rate.

The $\Delta_{rate\_x \; to \; rate\_y}$ value is initially a default value that has been determined by experimentation to be appropriate for the particular area in which the base station is located. In the preferred embodiment, the radiotelephone continuously modifies $\Delta_{rate\_x \; to \; rate\_y}$ as described subsequently. Alternate embodiments use the default settings for $\Delta_{rate\_x \; to \; rate\_y}$ without alteration.

Since there are four different data rates (full, ½, ¼, and ⅛) in IS-95, there are six different predetermined power Δ's in the present invention: $\Delta_{full\ to\ 1/2}$, $\Delta_{full\ to\ 1/4}$, $\Delta_{full\ to\ 1/8}$, $\Delta_{1/2\ to\ 1/4}$, $\Delta_{1/2\ to\ 1/8}$, and $\Delta_{1/4\ to\ 1/8}$. For example, if the base station lowers its rate from full to ¼, then the base station reduces its transmit power by $\Delta_{full\ to\ 1/4}$. There are also six different predetermined power Δ's that apply when the data rate is increased. However, in the preferred embodiment these Δ's are the same as the Δ's used for the decrease in data rate. For example, $\Delta_{1/4\ to\ full} = \Delta_{full\ to\ 1/4}$. Alternate embodiments use different predetermined power Δ's for the same rate increase/decrease.

The $\Delta_{rate\_x\ to\ rate\_y}$ is communicated from the base station to the radiotelephone as a special message on the forward traffic channel before a call starts. This value is stored in the radiotelephone for future use so that the power and target $E_s/N_o$ changes effected by both the base station and the radiotelephone are synchronized.

Referring again to the process of FIG. 7, after the transmit power reduction by the base station, the radiotelephone is expecting a certain target $E_s/N_o$ for the previous power level since it is not yet aware of the rate and power reduction. The radiotelephone, therefore, sends a power control command back to the base station instructing the base station to power up. The base station, obviously aware of the rate and power reduction, ignores the power control command from the radiotelephone for one frame duration (step 735). The frame duration is configured to account for processing and propagation delays.

After one frame duration, the radiotelephone has had time to demodulate the frame and now realizes that the frame rate has been decreased (step 740). The radiotelephone then decreases its target $E_s/N_o$ by the same $\Delta_{rate\_x\ to\ rate\_y}$, (step 745) since it has this Δ stored.

If the frame rate increases (step 705), the average $E_s/N_o$ requirements are higher. In this case, the base station increases its transmit power by $\Delta_{rate\_x\ to\ rate\_y}$ (step 710). The base station then ignores all power control commands for a predetermined length of time (step 715). In the preferred embodiment, this length of time is for a frame duration. In alternate embodiments, the system operator decides the length of time.

The radiotelephone then receives and demodulates the first frame after the rate change. From this, the radiotelephone determines the new frame rate (step 720) and modifies the target $E_s/N_o$ to increase by $\Delta_{rate\_x\ to\ rate\_y}$ (step 725).

In order to modify/optimize the Δ values, the radiotelephone continuously monitors the average $E_s/N_o$ required for each frame rate as it operates. The above six power Δ's are then determined by subtracting the appropriate $E_s/N_o$ values:

$$\Delta_{full\text{-}to\text{-}1/4} = \overline{(E_s/N_o)}_{full} - \overline{(E_s/N_o)}_{1/4}.$$

For example, as a radiotelephone operates, it determines that the average $E_s/N_o$ required for eighth rate frames for the last N eighth rate frames is 5 dB and the average $E_s/N_o$ required for full rate frames within the last N full rate frames is 8 dB. For this example, $\Delta_{full\ to\ 1/8} = 3$ dB.

The modified Δ's are then transmitted to the base station. The Δ values are stored in the radiotelephone. In one embodiment, the radiotelephone has one Δ value stored for a rate increase and another Δ value for a rate decrease.

Alternate embodiments use only the fixed default values for Δ. Additionally, other embodiments modify the Δ values using other techniques than averaging the $E_s/N_o$ requirements for each frame rate.

Ideally, the radiotelephone should never be given too much power. Therefore, in the preferred embodiment, the radiotelephone in the service area sends the Δ estimates to the network. The network determines from all of the received Δ's, through an averaging technique, what Δ increase should be used and what Δ decrease should be used. This may then be transmitted to the radiotelephone as a message or over the forward link, enabling these values to be periodically adjusted.

The preferred embodiment of this process operates in a fast forward link power control environment. The data rate change process of the present invention, however, is not limited to fast forward link power control. The data rate change process is also not required for proper operation of the fast forward link power control process of the present invention.

The performance benefits of using the fast forward link power control process varies as a function of the radiotelephone's speed and location. Traveling at higher speeds, it may be desirable to use the current IS-95 implementation of forward link power control, subsequently referred to as IS-95 forward power control. At the higher speeds, the fast forward power control process of the present invention does not produce as great a performance gain as it does at slower speeds in terms of capacity per given grade of service.

At higher speeds, the radiotelephone travels through fades too rapidly for the fast forward power control process to update/track the base station's transmit power. Additionally, the error correction built in to the radiotelephone can handle the rapid fading and the interleaving of data bits.

Faster speeds may require the use of the IS-95 forward power control for better performance. The power control trigger process of the present invention triggers a switch to the IS-95 forward power control from the fast forward link power control process when the radiotelephone's speed goes above a predetermined speed threshold. Below this threshold, the fast forward link power control process produces increased performance over prior art processes.

Alternate embodiments determine the speed and/or location information in different ways. In one embodiment, the location and speed information is determined from a global positioning receiver built into the radiotelephone.

For the power control trigger process, the radiotelephone periodically transmits its speed information to the base station(s) with which it is communicating. In the preferred embodiment, the speed information is part of a message sent on the reverse power control channel. Alternate embodiments transmit the speed information on the reverse traffic channel.

The radiotelephone's hand-off status is also a trigger for switching between the prior art process of power control and the fast forward link power control process of the present invention. When communicating with two or more base stations, the performance obtained by using the fast forward link power control process may not be superior to that of IS-95 forward power control.

Figure 8:
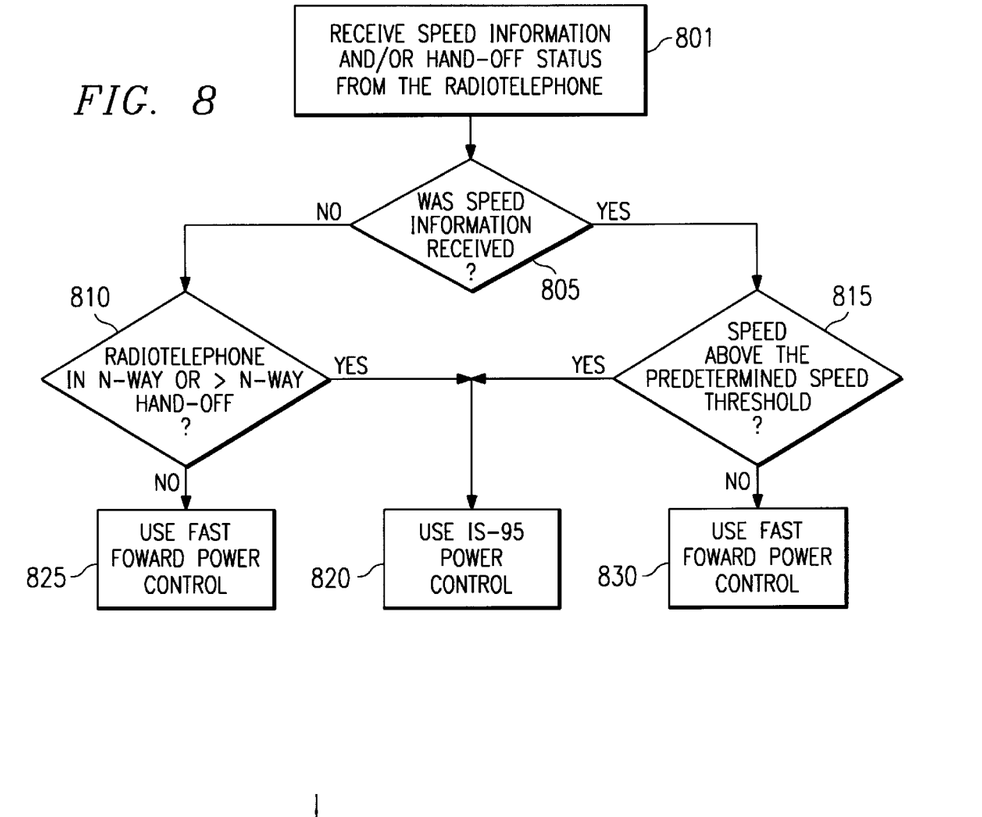
FIG. 8 shows a flowchart of a power control trigger process.

A flowchart of the power control trigger process of the present invention is illustrated in FIG. 8. The process begins by the base station receiving the speed and/or hand-off status from the radiotelephone (step 801). In the preferred embodiment, this information is sent over the reverse power control signaling channel. The base station then determines if speed information was received (step 805).

If speed information was received, the base station compares the received speed information with the predetermined speed threshold (step 815). If the speed information indicates that the radiotelephone's speed is less than the threshold, the fast forward power control process of the present invention is used (step 830). If the speed information indicates the radiotelephone's speed is greater than the threshold, the prior art IS-95 power control is used (step 820).

If the radiotelephone's hand-off status was received (step 805), the number of base stations (cells) is compared to the hand-off link threshold (step 810). If the number of base stations is less than the threshold, the fast forward power control process of the present invention is used (step 825). If the number of base station is greater than the threshold, the prior art IS-95 power control is used (step 820).

In the power control trigger process, once the base station controller determines that IS-95 power control is to be used, it simply ignores the power up/down commands coming from the radiotelephone. To determine the starting power value in IS-95 power control, the base station uses the last power value from fast forward power control. Similarly, when switching from IS-95 power control to fast forward power control, the base station controller instructs the base stations to start using the power up/down commands coming from the radiotelephone.

Figure 9:
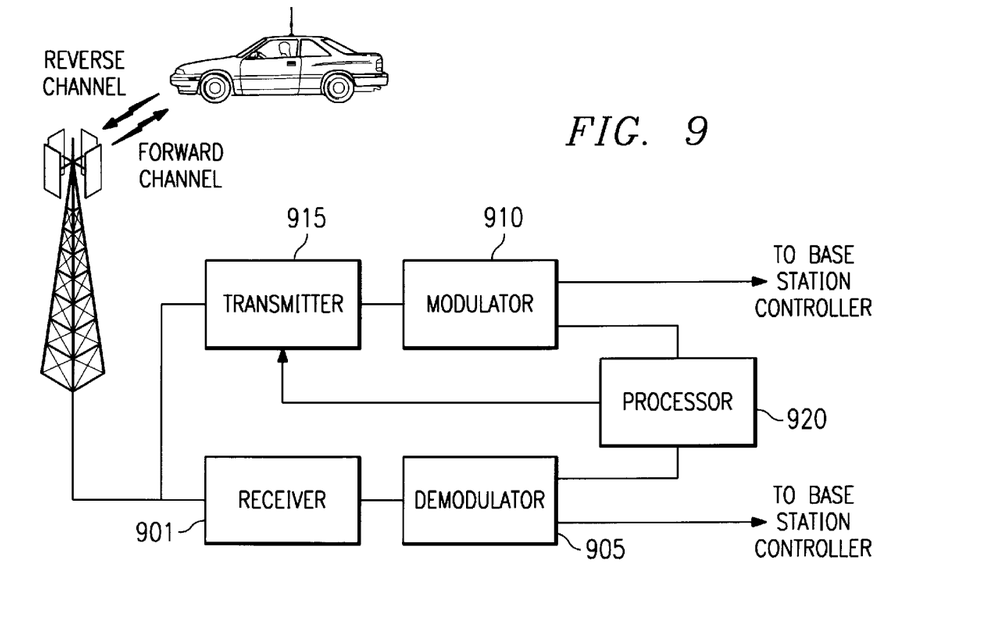
FIG. 9 shows a block diagram of a base station of the present invention.

FIG. 9 illustrates a base station of the present invention. The base station is comprised of a receiver (901) for receiving the radio signals from the radiotelephone over the reverse traffic channel and the reverse power control signaling channel. The received signal is input to a demodulator (905) for coherent demodulation. The demodulated signal is sent to the base station controller for routing to the appropriate destination.

A modulator (910) is used to modulate any signal from the base station controller to be transmitted. The modulated signal is transmitted, at the power set by the transmitter (915), over the forward channel.

The transmit power of the transmitter is controlled by the base station processor (920). The processor receives the power control commands from the demodulator (905), interprets them, and adjusts the transmit power accordingly.

The reverse power control signaling channel has the ability for communicating various information from the radiotelephone to the base station. This information includes the power control information, the rate change information, the pilot strength information, velocity information, and the frame quality information on forward link frames. Additionally, if the radiotelephone is equipped with global positioning system or other navigation hardware, the reverse power control signaling channel can handle position information. Other embodiments use the reverse power control signaling channel for other information required to be transmitted from the radiotelephone to the base station(s).

The above information transmitted over the reverse power control signaling channel may be transmitted periodically, such as in the case of pilot strength information. The information may be transmitted continuously, such as in the case of the power control information. The rate change information may be transmitted only when it occurs. In one embodiment, the information is formatted as a predetermined protocol to reserve locations in the frames for the various bits of information. Other embodiments transmit the information on an as needed basis.

In summary, the above described power control process of the present invention is comprised of many beneficial aspects. A reverse power control signaling channel and a reverse pilot channel are used to communicate power control commands from the mobile radiotelephone to the base station. The power control commands are based on an estimated $E_s/N_o$.

Another benefit of the above invention occurs during soft hand-off. The process of the present invention synchronizes the power of the base stations communicating with the mobile radiotelephone. This has the effect of decreasing base station transmit power thereby increasing capacity.

Additionally, capacity is increased by changing the base station transmit power when the data rate is changed. By decreasing transmit power when the data rate decreases and increasing transmit power when the data rate increases, system capacity is improved while maintaining grade of service.

Finally, the mobile radiotelephone's speed and hand-off status is used to choose a power control process. A faster speed and/or large number of hand-off links indicates that the IS-95 power control process should be used. A slower speed and/or low number of hand-off links indicates that the power control process of the present invention should be used.

We claim:

1. A method for determining a symbol-energy-to-noise-density ratio of a received signal in a radio communication channel, the radio comprising a correlator that outputs a plurality of soft value pairs, the soft value pairs existing in an I and Q axes system where the I and Q axes intersect at the origin forming a four quadrant system, a first fade line extending through the origin at a 45° angle to the I axis and a second fade line extending through the origin at a 135° angle to the I axis, the method comprising the step s of:

determining I channel and Q channel components for each soft value pair of the plurality of soft value pairs;

determining a location for each soft value pair, with respect to the closest fade line, in response to the I and Q channel components;

averaging the locations of the plurality of soft value pairs over a predetermined duration to determine the noise density;

determining the symbol energy; and dividing the symbol energy by the noise density.

2. The method of claim 1 wherein the predetermined duration is a period of time during which n samples are taken in the power control group.

3. The method of claim 1 wherein the step of determining the location of each soft value includes the steps of:

determining a soft value distance comprising the distance from each pair of soft values to the origin; and determining a perpendicular distance from each pair of soft values to the closest fade line.

4. A method for determining the symbol energy for use in calculating the symbol-energy-to-noise-density ratio of a signal received by a radio from a base station, the radio comprising a correlator that outputs a plurality of soft values, the soft values existing in an I and Q axes system where the I and Q axes intersect at the origin forming a four quadrant system, a first fade line extending through the origin at a 45 angle to the I axis and a second fade line extending through the origin at a 135 angle to the I axis, the method comprising the steps of:

determining I channel and Q channel components for each pair of soft values of the plurality of soft values;

determining a soft value distance from the origin to each soft value pair in response to the I and Q channel components;

determining a soft value angle between the closest fade line and a line passing through each soft value pair and the origin;

determining a perpendicular distance from the soft value pair to the closest fade line in response to the soft value angle and distance;

averaging the square of the soft value distances over a predetermined time duration to generate a soft value average distance squared;

determining a variance of a noise power of the channel, over a predetermined time duration, to generate a perpendicular distance average that is equal to one-half the noise density; and determining the symbol energy by the difference of the soft value average distance squared and twice the square of the perpendicular distance average.

* * * * *